United States Patent [19]

Tanaka et al.

[11] 3,929,416

[45] Dec. 30, 1975

[54] PROCESS AND APPARATUS FOR PRODUCING GYPSUM LUMPS

[75] Inventors: Hirobumi Tanaka, Sendai; Norio Arashi, Hitachi; Yukio Hishinuma, Hitachi; Zensuke Tamura, Hitachi, all of Japan

[73] Assignee: Hitachi, Ltd., Japan

[22] Filed: May 8, 1973

[21] Appl. No.: 358,335

[30] Foreign Application Priority Data
May 10, 1972 Japan.............................. 47-45471

[52] U.S. Cl. ....................... 23/260; 23/285; 259/8; 259/158; 423/555
[51] Int. Cl.² .. B01F 7/16; B01F 15/00; B28C 1/22; C01F 11/46
[58] Field of Search ......... 23/260, 285, 287, 253 A; 259/7, 8, 23, 24, 158; 423/555, 166

[56] References Cited
UNITED STATES PATENTS

| | | | |
|---|---|---|---|
| 2,888,324 | 5/1959 | Allen | 23/287 X |
| 3,165,380 | 1/1965 | Warner | 23/287 X |
| 3,666,419 | 5/1972 | Cahour et al. | 23/253 A X |
| 3,669,416 | 6/1972 | Sutter et al. | 259/21 |
| 3,726,647 | 4/1973 | Somerville | 23/285 X |

*Primary Examiner*—Morris O. Wolk
*Assistant Examiner*—Barry I. Hollander
*Attorney, Agent, or Firm*—Craig & Antonelli

[57] ABSTRACT

When limestone is reacted with sulfuric acid to produce gypsum, the limestone and sulfuric acid, which are continuously fed to a reactor, are moved through the reactor and a discharger while rotating reactants and products in course of a gypsum-forming process. Gypsum lumps are continuously obtained as a product thereby.

20 Claims, 3 Drawing Figures

PROCESS AND APPARATUS FOR PRODUCING GYPSUM LUMPS

This invention relates to a process and apparatus for producing gypsum lumps by reaction of limestone with sulfuric acid.

Recently, gypsum has been used more and more as a raw material for cement and architectural boards, and now a shortage of supply of gypsum as the raw material is a problem.

Natural gypsum, by-product gypsum from the manufacture of phosphoric acid fertilizer, or synthetic gypsum prepared from waste sulfuric acid and limestone, etc., have been heretofore main sources of the gypsum, and have been used all in a powdery state. For example, explanation will be made of gypsum from the manufacture of phosphoric acid fertilizer.

Gypsum obtained from the manufacture of phosphoric acid fertilizer is normally in the form of a powder of columnar crystals having a length of about 100 to 300 $\mu$, and inevitably contains water owing to the separation of gypsum from a suspension of phosphoric acid and gypsum. Usually, the gypsum contains 10 % by weight or more of free water. The water content of the gypsum is liable to increase, when particle sizes of the crystals are decreased. Almost equal phenomena are observed also in the case of the synthetic gypsum. When gypsum having a high water content is used as a raw material for cement, flow of the gypsum is deteriorated at a gypsum hopper and often causes cloggings. Therefore, since powdery gypsum is inconvenient to handle, it has sometimes been necessary to mix it with natural gypsum or agglomerate the powdery gypsum. That is, under the current situation, additional steps as mentioned above are necessary. To decrease the water content, particle sizes of the crystals must be increased, but such procedure is not desirable from the viewpoint of distribution of gypsum in mixing with cement clinkers. Therefore, gypsum lumps of small crystals having a low water content has been required for the synthetic gypsum.

An object of the present invention is to satisfy said requirement.

Another object of the present invention is to provide a process and apparatus for continuously producing gypsum lumps of very fine crystals, requiring no operation to separate water from the lumps in producing synthetic gypsum by reaction of limestone with sulfuric acid.

According to the present invention, gypsum is produced in a lump state by moving limestone and sulfuric acid continuously fed to a reactor through the reactor and a discharger, while rotating or giving turning movement to reactants and products in the course of the gypsum-forming process.

The present inventors conducted experiments on the production of gypsum, changing various conditions, for example, concentration of sulfuric acid, temperature, structures of a reactor and discharger, etc., and found the following fact. That is, the most suitable concentration of sulfuric acid is about 50 to 60 % by weight for producing solidified gypsum lumps. When the concentration of sulfuric acid is less than about 50 % by weight, desirable reaction is carried out only at a temperature of more than about 60°C, and when the concentration of sulfuric acid is more than about 60 % by weight, the desirable reaction is carried out only below the normal temperature. That is, it is preferable to carry out the gypsum-forming reaction at a temperature from the normal to about 60°C at a concentration of sulfuric acid of about 50 to 60 % by weight. Solidified dihydrate gypsum lumps are hardly obtainable under the conditions other than that mentioned above.

Further, the particle sizes of limestone powder as a raw material exerts substantially no influence upon the properties of the gypsum formed although the particle size exerts a substantial influence upon reaction time. Reaction is retarded with an increase in particle size, and thus the limestone inevitably remains in an unreacted state for a longer period of time. Consequently, the reactants and products in the reactor will be harder to handle since the intermediate reaction stage in which the materials are in a sticky state will last for a longer time. The particle sizes, which are easiest to handle, are about 100 to 200 mesh pass.

Solidified dihydrate gypsum lumps are formed under these conditions owing to formation of a large amount of semihydrate gypsum ($CaSO_4 \cdot \frac{1}{2}H_2O$) and successive hydration reaction of the semihydrate gypsum to dihydrate gypsum ($CaSO_4 \cdot 2H_2O$). The dihydrate gypsum formed by the hydration reaction is a strong entanglement of crystals themselves, and produces so hard lumps that they cannot be easily crushed with fingers. The hydration behaves in a manner quite identical with the reaction, which occurs when calcined gypsum is hardened with water, and the resulting gypsum lumps have a hardness as high as that of the hardened calcined gypsum.

No hydration reaction takes place aside from said preferable conditions, for example, when the concentration of sulfuric acid and temperature are too high, and the hardness is decreased. On the other hand, when the concentration of sulfuric acid and temperature are too low, yield of semihydrate gypsum is smaller, and the semihydrate gypsum cannot be converted to the solidified lumps. That is, only lumps that are readily crushable with fingers are formed in that case.

Therefore, dihydrate gypsum useful for cement and other applications can be produced by conducting the reaction of said sulfuric acid solution with limestone powders under said conditions in a reactor provided with controlling instruments for mixing the sulfuric acid solution with the limestone powders under said conditions to produce solidified dihydrate gypsum lumps.

Now, the present invention will be explained in detail by way of the accompanying drawings.

Figure 1:
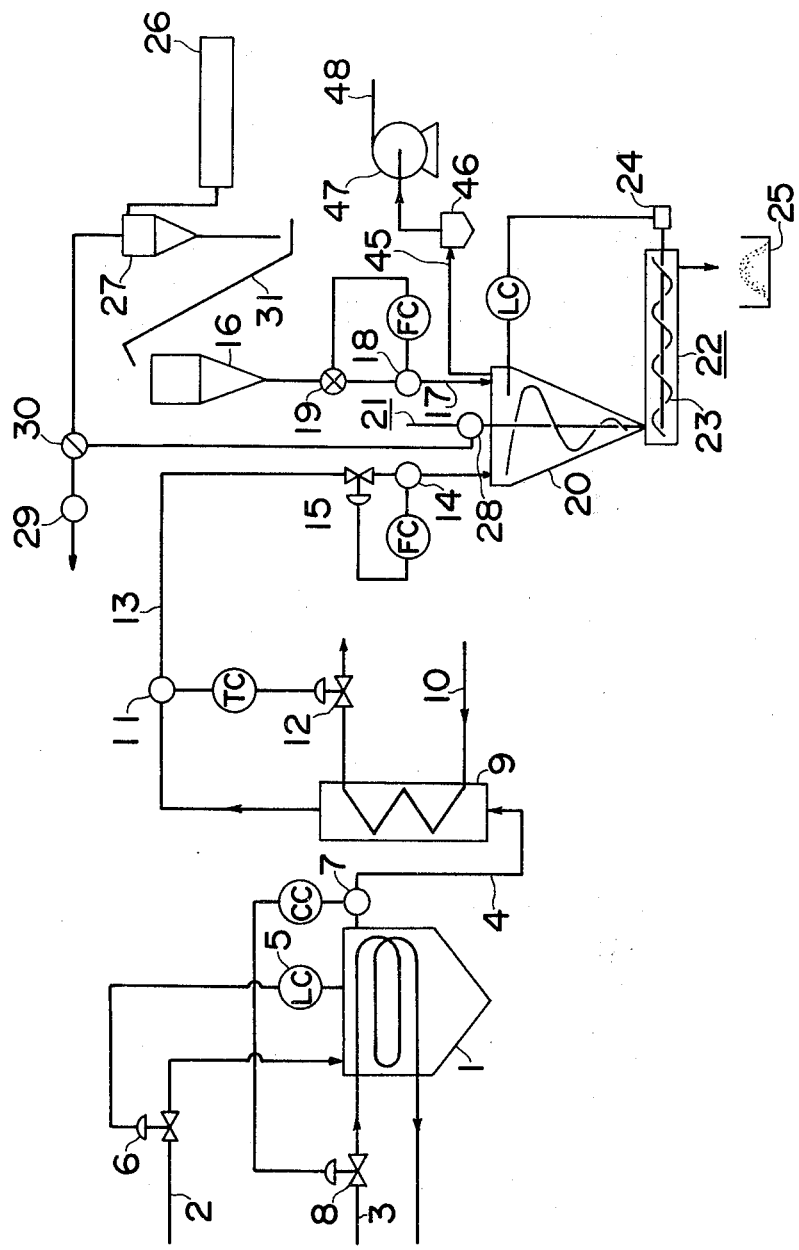
FIG. 1 is a schematic flow diagram of an apparatus for producing gypsum lumps according to the present invention.

In FIG. 1, an embodiment of using dilute sulfuric acid as the sulfuric acid that reacts with limestone is shown. The dilute sulfuric acid is fed to a concentrator 1 through a conduit 2 for feeding dilute sulfuric acid to concentrate the dilute sulfuric acid to a concentration required for producing solidified dihydrate gypsum lumps. Heating steam is supplied to the concentrator 1, for example, through a conduit 3 for feeding heating steam to furnish heat for evaporation of the dilute sulfuric acid. The sulfuric acid concentrated in the concentrator 1 is at an elevated temperature and therefore cooled through a cooler 9 to a temperature required for producing the solidified dihydrate gypsum lumps, that is, to a suitable temperature ranging from the normal up to about 60°C, and fed to a reactor 20 through a conduit 13. Cooling water is supplied to the cooler 9 through a conduit 10.

To maintain the concentration of sulfuric acid at a desired percentage between about 50 and 60 % by weight, the concentration is detected by a sulfuric acid concentration meter 7 at an outlet of the concentrator 1, and the feeding rate of heating steam is controlled by a control valve 8. To maintain a temperature of sulfuric acid at a proper one, for example, 60°C when the concentration of sulfuric acid is 50 % by weight, or normal temperature when the concentration of sulfuric acid is 60 % by weight, the temperature is detected by a thermometer 11 at an outlet of the sulfuric acid cooler 9, and a rate of cooling water is controlled by a control valve 12 for discharging the cooling water so as to keep the temperature in the desired temperature range of the normal to 60°C. On the other hand, feeding rates of sulfuric acid and limestone to the reactor 20 must be maintained constant. A flow rate of sulfuric acid is detected by a sulfuric acid flow meter 14, and controlled by a control valve 15 so as to keep the flow rate always constant. As to a flow rate of limestone, a discharge rate from a hopper 16 is also detected by a powder flow meter 18, rate of rotation of a rotary valve 19 is adjusted to maintain the limestone feed rate constant. As to the flow rate of dilute sulfuric acid, the level of the concentrator 1 is detected by an electrical contact-type level detector, and the flow rate is controlled by a control valve 6.

In the reactor 20, the sulfuric acid and limestone from the conduit 17 are vigorously stirred by a stirrer 21 and subjected to reaction. The resulting gypsum is transferred from the reactor 20 to a discharger 22, while being agglomerated into lumps of suitable sizes by agitation in a plastic state just before solidification, and discharged under an action of screws 23 of the discharger 22 from the outlet of the discharger to a storage tank 25 after the lumps have been completely solidified at the outlet. In this case, the level of the reactor is kept constant by detecting the level of the reactor by an electrical contact-type level detector and changing rate of rotation of a motor 24 of the discharger 22 to control the discharging rate of the gypsum lumps. The motor 24 is a variable speed driving means, independent from the reactor 20.

To repress the particle sizes of limestone to a definite range, the torque of the stirrer 21 is detected by a torque converter 28. When the torque is decreased with an increase in the flowability of the mixture within the reactor due to an increase in unreacted materials, an air flow rate of a pneumatic separator 27 of a limestone mill 26 is changed by adjusting a damper 30 to make smaller the particle sizes of the limestone to be separated and discharged to conveyor 31. The air is exhausted from the pneumatic separator 27 by a blower 29.

Figure 2:
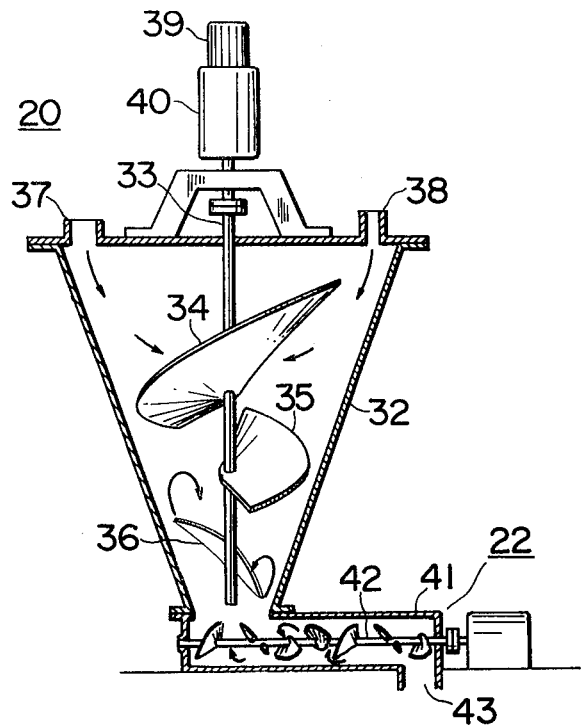
FIG. 2 is a cross-sectional elevation view of a reactor and a discharger for the formed gypsum, shown in FIG. 1.
Figure 3:
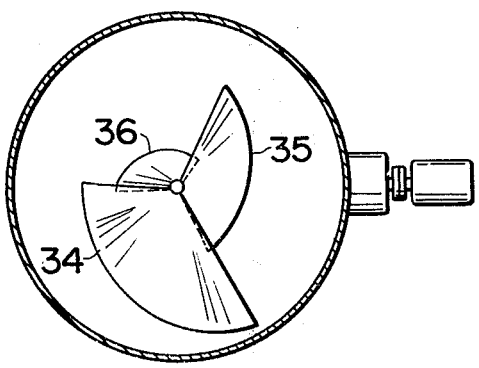
FIG. 3 is a cross-sectional plan view of the reactor of FIG. 2.

In FIGS. 2 and 3, details of the reactor 20 and the discharger 22 are illustrated. The reactor 20 is a conical vessel 32, in which a stirrer 33 is provided. The stirrer 33 consists of a rotating shaft provided with a plurality of stirring blades 34, 35 and 36 at multi-stages with spaces between the blades. The raw materials are fed to the reactor through an inlet 37 for the limestone and an inlet 38 for the sulfuric acid. The raw materials thus fed are mixed and stirred by the stirrer 33 driven by a motor 39 through a speed reducer 40, and the reaction of the limestone with sulfuric acid proceeds. The content of the reacting mixture within the reactor is controlled so that an upper level of the reacting mixture may be located approximately at a mounting position of the first stage stirring blade 34 on the stirrer shaft. The reacting mixture is forced down by revolution of the stirring blades 34 and 35 with the progress of the reaction, and the resulting solidified gypsum is pushed out by the lowest stage stirring blade 36. The gypsum is then entered into a cylindrical discharger 41, and discharged from an outlet 43 to the storage tank 25 by a conveyor 42 having similar stirring blades or screws with notched blades.

In the reaction of limestone with 50 to 60 wt. % sulfuric acid, as described above, there appear changes in phase from a state of very high flowability at the mixing and reaction initiation period of the raw materials to a state of a very low flowability at the formation of solidified gypsum at the final stage of reaction. As the intermediate state, a plastic state of high adhesiveness appears between these initial and final stages. Such materials having a high adhesiveness cannot be continuously treated by the conventional screw-type mixing stirrer, because the blades of the screw are extended axially in continuation, and the reacting mixture sticks to the grooves between the blades and fills the grooves. That is, the stirring and forwarding actions are deteriorated, and continuous operation cannot be carried out.

According to the present invention, three stirring blades in a shape of sector of a circle having a sector angle of 120° to 160° are fixed multistage-wise to the rotating shaft 33, so that its apex may be on the shaft, with its circular edge being extended towards the inside wall of the conical vessel 32, and the sector may be inclined at 25° to 40° against the horizontal direction, as shown in FIG. 2. The stirring blades are shown there to be further slightly overlapped with each other, when viewed from the axial direction and perpendicular direction to the stirring shaft 33, and must have spaces between the blades themselves. The conveyor blades of the discharger 42 has a structure similar to that of the stirrer blades of the reactor 32.

Therefore, the product gypsum at the final stage of reaction is discharged into the discharger 42 while being subjected to rotating motion accompanied with backward flowing in the space between the blades from the final stage stirring blade 36 over to the discharger 41, as shown by arrows in FIG. 2, and further discharged from the discharger 42 as solidified gypsum lumps having sizes of 20 to 30 mm, while being subjected to rotating motion by the conveyor 42. At that time, a good result can be obtained when the number of revolutions of the stirrer is restricted to 30 rpm or less. To improve the downward flow of the reacting mixture, a suitable curve can be provided on the stirring blade and a good effect can be attained with a smaller blade area.

It is sufficient that a retention time for reaction within the reactor is about 5 to 10 minutes, and the entire retention time including the retention time in the discharger is only about 20 minutes or less. When limestone is fed to the reactor in about 10 wt. % excess over the reaction equivalent, the reaction will be almost completed within a reaction time of about 5 minutes. In that case, feeding of limestone in excess of more than 10 wt. % is not desirable in view of the quality of the product gypsum.

As described above, the reactor itself can be made very compact in the present invention.

Much heat is released by the reaction of sulfuric acid with limestone in the reactor. For example, when the concentration of sulfuric acid exceeds 50 wt. %, the temperature of the reaction mixture partially exceeds 100°C with ease at the reaction. Sulfuric acid mists are evolved from the reactor by the vigorous reaction, which starts just after the mixing of the reactants, and pass through a vent conduit 45 together with carbon dioxide gas generated by the reaction. The mists are separated in a separator 46, and only carbon dioxide gas is exhausted from a vent 48 by a blower 47. The sulfuric acid separated in the separator 46 is returned to the sulfuric acid concentrator 1 or other sulfuric acid supply line. A pressure increase can be avoided in the reactor by providing said system for removing sulfuric acid mists.

What is claimed is:

1. An apparatus for producing solidified gypsum lumps comprising an inverted conical reactor having an inlet in an upper portion thereof for supplying sulfuric acid and limestone and an outlet at a lower portion thereof, discharging means arranged at the outlet of said reactor for conveying gypsum lumps produced in said reactor, a rotating shaft vertically disposed in said reactor, and a plurality of sector blades arranged in a staggered relationship around said rotating shaft, each blade being arranged at an inclined angle with respect to the axis of said rotating shaft, the outer peripheries of the sector blades extending to near the inner surface of said inverted conical reactor.

2. The apparatus of claim 1, wherein said discharging means comprises a cylindrical vessel having an inlet at one end thereof communicating with the outlet of said inverted conical reactor, an outlet at the other end of said cylindrical vessel, a rotating shaft disposed in said cylindrical vessel, and a plurality of blades arranged in staggered relationship around said shaft, each blade being positioned at an inclined angle with respect to the axis of the rotating shaft in said cylindrical vessel.

3. The apparatus of claim 2, further comprising first driving means for rotating the rotating shaft in said reactor and a second driving means for rotating the rotating shaft in said cylindrical vessel.

4. The apparatus of claim 3, wherein said first drive means and said second drive means operate independently of one another.

5. The apparatus of claim 4, further comprising control means for controlling the rotation of the rotating shaft in said cylindrical vessel in response to the level of materials in said reactor.

6. The apparatus of claim 2, wherein said sector blades slightly overlap one another when viewed from a direction perpendicular to the rotating shaft in said reactor.

7. The apparatus of claim 2, wherein said sector blades slightly overlap one another when viewed from the axial direction with respect to the rotating shaft in said reactor.

8. The apparatus of claim 2, wherein said sector blades are curved to improve the downward flow of the reacting mixture engaged by said sector blades.

9. The apparatus of claim 2, wherein said sector blades define a leading edge and a trailing edge defining with said leading edge an apex mounted on the rotating shaft in said reactor, said sector blades further defining a curved edge opposite said apex, the curved edge of each conical blade conforming to the portion of the reactor through which each respective conical blade rotates.

10. The apparatus of claim 9, wherein the trailing edge of each sector blade radially overlaps the leading edge of the adjacent higher sector blade.

11. The apparatus of claim 10, wherein the apexes of said sector blades define angles of about 120° to about 160°.

12. The apparatus of claim 11, wherein said sector blades are curved.

13. The apparatus of claim 10, wherein said sector blades are curved.

14. The apparatus of claim 10, wherein the leading edge of each sector blade horizontally overlaps the trailing edge of the next adjacent higher sector blade.

15. The apparatus of claim 14, wherein the apexes of said sector blades define angles of about 120° to about 160°.

16. The apparatus of claim 1, wherein said sector blades tightly overlap one another when viewed from a direction perpendicular to the rotating shaft in said reactor.

17. The apparatus of claim 1, wherein said sector blades slightly overlap one another when viewed from the axial direction with respect to the rotating shaft in said reactor.

18. The apparatus of claim 1, wherein said sector blades define a leading edge and a trailing edge defining with said leading edge an apex mounted on the rotating shaft in said reactor, said sector blades further defining a curved edge opposite said apex, the curved edge of each conical blade conforming to the portion of the reactor through which each respective conical blade rotates.

19. The apparatus of claim 18, wherein the trailing edge of each sector blade radially overlaps the leading edge of the adjacent higher sector blade.

20. The apparatus of claim 19, wherein the leading edge of each sector blade horizontally overlaps the trailing edge of the next adjacent higher sector blade.

* * * * *